Jan. 11, 1949.   A. R. COOPER   2,458,767
CLUTCH CONTROL

Filed May 2, 1944   2 Sheets-Sheet 1

INVENTOR.
Allyn R. Cooper
BY Bair & Freeman
ATTORNEYS

Jan. 11, 1949.    A. R. COOPER    2,458,767
CLUTCH CONTROL

Filed May 2, 1944    2 Sheets-Sheet 2

INVENTOR.
Allyn R. Cooper
BY
Bair & Freeman
ATTORNEYS

Patented Jan. 11, 1949

2,458,767

UNITED STATES PATENT OFFICE 2,458,767

CLUTCH CONTROL

Allyn R. Cooper, Marshalltown, Iowa

Application May 2, 1944, Serial No. 533,815

2 Claims. (Cl. 74—242.1)

My present invention relates to a clutch control structure which is particularly adapted for a power driven lawn mower.

One object of the invention is to provide a clutch control structure using a V-belt as a driving means between a power driven pulley on the mower frame and the counter-shaft, the counter-shaft being movable in such manner that the belt can be loosened relative to the driving pulley and thereby serve as a clutch means.

More particularly it is my object to provide a clutch control structure in the form of a base that may be mounted on a power driven lawn mower, and having a frame pivoted thereto and carrying a counter-shaft on which a pulley is mounted, a belt surrounding this pulley and the driving pulley, and a guard being carried by the frame in such manner as to loosen the belt on the driving pulley when the frame is swung in one direction.

A further object is to provide a projection from the base for co-acting with the belt in loosening it on the driving pulley and to provide a spring and toggle lever arrangement for operating the clutch structure to engaged or disengaged position as desired.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1:
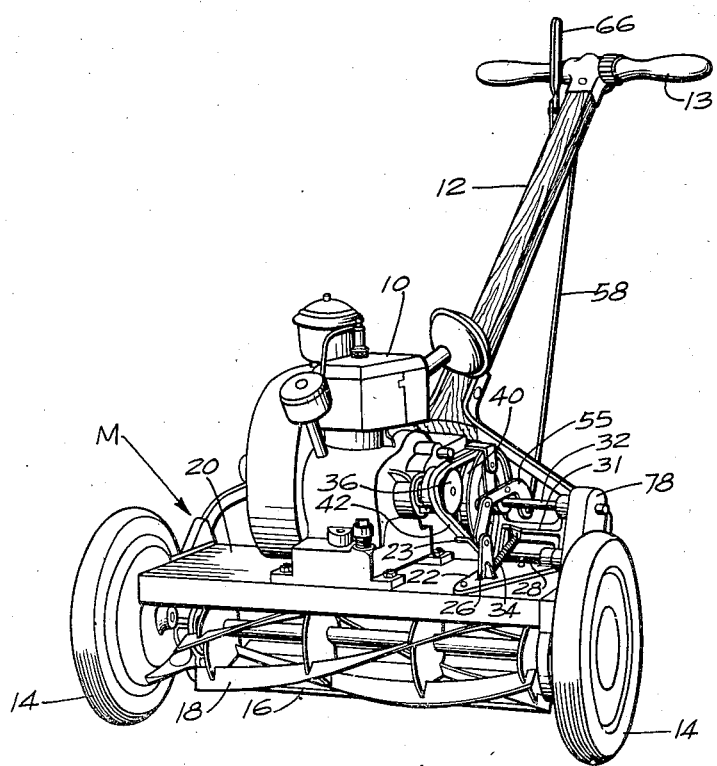
Figure 1 is a perspective view of a clutch control structure embodying my invention.

My clutch control structure is adapted for mounting on a lawn mower indicated generally at M, and including a power means such as an internal combustion engine 10, a handle 12, traction wheels 14, a mower bar 16 and a mower reel 18. A frame or platform 20 is used as a mounting means for the engine 10.

My clutch control structure comprises a base 22 mounted on the platform 20 and provided with a pair of upstanding ears 24 and, ahead of them, a single ear 26. Pivoted at 28 is a countershaft frame 30 in which I journal a countershaft 32. The frame 30 is biased to move toward the ear 26 by a spring 34 connected to a stop arm 31 of the frame 30 and the ear 26.

A driving pulley 36, preferably of the "V-belt" type, is mounted on the shaft 38 of the engine 10 and a companion driven pulley 40 is mounted on one end of the countershaft 32. A V-belt 42 is utilized as a power transmission from the pulley 36 to the pulley 40. For cooperation with the belt 42 in a manner to be hereafter described, a belt guard 44 is provided and is shaped to partially surround the driven pulley 40 in order to keep the belt 42 closely adjacent the pulley. The belt guard 44 has a pair of arms 46 extended toward the countershaft 32 and connected to ears 48 of the frame 30, whereby the belt guard is supported for movement with the frame.

Connecting the ear 26 with an ear 50 of the frame 30 is a pair of toggle links 52 and 54. The link 54 has an extension 55 provided with a hub 56. A control rod 58 has a right angular end 60 extended through the hub 56 and retained in position relative thereto by a cotter key 62. The upper end of the rod 58 is similarly connected with an extension 64 of a control lever 66. The lever 66 is pivoted at 68 to a bracket 70 attached to the bottom of the handle 12 adjacent the hand grips 13 thereof.

The countershaft 32 is adapted for driving the wheels 14 as by a sprocket pinion 72, a chain 74 and a sprocket 76. The sprocket 76 is mounted on the shaft of the mower reel 18 and drives the wheels 14 through a pinion 75 and a ring gear 77.

The pivot 28 for the frame 30, it will be noted, is mounted between the axes of the sprockets 72 and 76 so as to minimize changing the distance between these axes and thereby minimizing interference with the operation of the chain when swinging the frame 30 about its axis 28. The chain is normally covered by a guard 78 (see Fig. 1), which guard has been omitted from Figs. 2 and 3.

Practical Operation

Figures 2, 4:
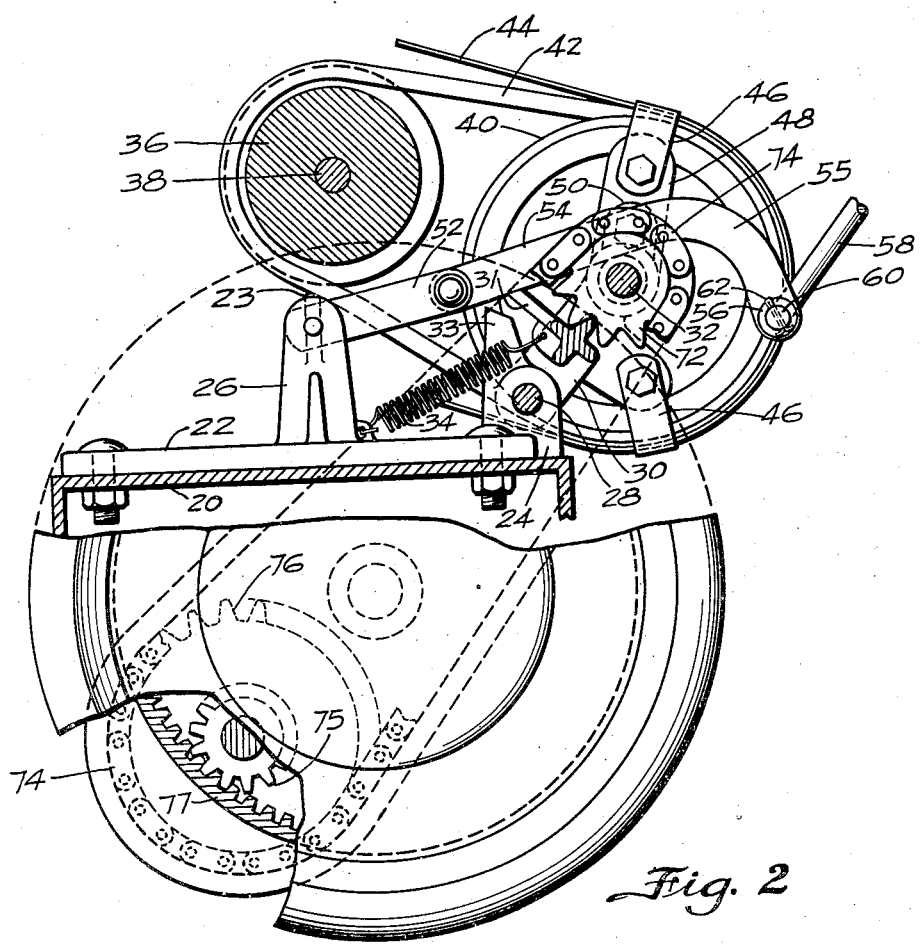
Figure 2 is a side elevation of the clutch control structure showing the "engaged" position.
Figure 4 is a side elevation of the clutch control lever mounted on the handle of the lawn mower.

In the operation of my clutch control structure, assuming the parts to be in the position of Fig. 2 and the solid line position of Fig. 4, it will be noted that the rod 58 has been pulled upwardly. By pushing the lever 66 forwardly, the links 52 and 54 have been swung from the position of Fig. 3 to the position of Fig. 2, with the link 54 against the stop 31. The links in this position have crossed over center slightly so that the spring 34 tends to keep them in the "clutch engaged" position. The belt 42 is tightened on the pulleys at this time and accordingly power is transmitted from the engine to the driving wheels of the mower.

Figure 3:
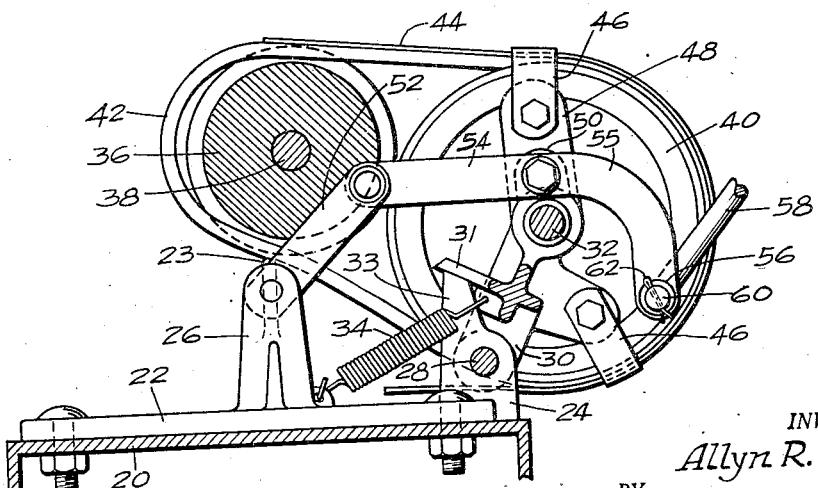
Figure 3 is a similar view showing the "disengaged" position.

When it is desired to "throw the clutch out," the lever 66 is swung to the dotted position of Fig. 4, thereby pushing downwardly on the rod 58 and "breaking" the toggle connection to permit the spring 34 to swing the frame 30 to the position of Fig. 3. In this position the stop 31 engages a stationary companion stop 33 extending upwardly from the base 22 and the guard 44 keeps the belt 42 in contact with the pulley 40, but pushes it to an out-of-contact position with respect to the drive pulley 36.

To aid in this operation of freeing the belt from the drive pulley, a stationary projection in the form of a rod 23 may extend from the base 22 or the ear 26 and be engaged by the belt as shown in this figure. The belt is thereby effectively held by the elements 23 and 44 from undesired contact with the driving pulley 36 in the "clutch out" position.

A comparatively simple arrangement has been disclosed for a clutch to transmit power of the magnitude encountered in connection with lawn mowers and the like. The structure is inexpensive to manufacture and can be easily installed on the mower and is readily operable at will for either connecting the engine operatively with the driving wheels of the mower or disconnecting it therefrom.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a clutch control structure, a driving pulley, a driven pulley, a belt connection between said pulleys, said belt including a normally outwardly bowed outer surface, a shaft for said driven pulley, a frame in which said shaft is journalled, a base for said frame, the frame being pivotally mounted relative to the base for swinging said shaft toward and away from said driving pulley, a spring connection with said frame to swing it in the direction of approach of said driven pulley toward said driving pulley, a stop for said frame in said direction, said belt being loose with respect to said pulleys when said frame engages said stop, a guard around said driven pulley said guard being secured to said frame to keep said belt closely adjacent said driven pulley and for moving the belt from contact with said driving pulley by engaging the outwardly bowed outer surface of the belt when said frame engages said stop, and a pair of toggle links providing a connection between said base and said frame and adapted to be moved to an over-center position for spacing said frame from said stop and tightening said belt around both of said pulleys in such spaced position.

2. In a clutch control structure for a mower or the like having a handle, a base for mounting on the mower, a power driven pulley mounted on the mower in fixed position relative to said base, a countershaft, a frame for journalling said countershaft, said frame being pivoted on said base, a spring tending to move said frame in one direction, a stop therefor, a driven pulley carried by said countershaft, a belt having an inner and outer surface and being disposed around the driven pulley and said driving pulley, a pulley guard carried by said frame and extending along the outer surface of said belt to keep it in the groove of said driven pulley while loosening the belt relative to the driving pulley when said frame is engaged with said stop, a toggle link connection between said base and said frame for spacing said frame from said stop and tightening said belt on said pulleys, an operating lever on said handle of the mower and a rod connection between said operating lever and said toggle links.

ALLYN R. COOPER.

REFERENCES CITED

The following references are of record in the file of this patent:

UNITED STATES PATENTS

| Number | Name | Date |
|---|---|---|
| 2,047,362 | Dunford | July 14, 1936 |
| 2,069,245 | Haines | Feb. 2, 1937 |
| 2,292,580 | Moyer et al. | Aug. 11, 1942 |